(12) United States Patent
Even-Chen et al.

(10) Patent No.: US 10,949,086 B2
(45) Date of Patent: Mar. 16, 2021

(54) SYSTEMS AND METHODS FOR VIRTUAL KEYBOARDS FOR HIGH DIMENSIONAL CONTROLLERS

(71) Applicant: The Board of Trustees of the Leland Stanford Junior University, Stanford, CA (US)

(72) Inventors: Nir Even-Chen, Stanford, CA (US); Krishna Vaughn Shenoy, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/664,738

(22) Filed: Oct. 25, 2019

(65) Prior Publication Data
US 2020/0133486 A1    Apr. 30, 2020

Related U.S. Application Data

(60) Provisional application No. 62/752,280, filed on Oct. 29, 2018.

(51) Int. Cl.
*G06F 3/0488*    (2013.01)
*G06F 3/023*    (2006.01)
(Continued)

(52) U.S. Cl.
CPC .......... *G06F 3/04886* (2013.01); *G06F 3/011* (2013.01); *G06F 3/017* (2013.01);
(Continued)

(58) Field of Classification Search
CPC .......... G06F 3/011; G06F 3/015; G06F 3/017; G06F 3/0216; G06F 3/0236; G06F 3/0237; G06F 3/04883; G06F 3/04886
See application file for complete search history.

(56) References Cited

U.S. PATENT DOCUMENTS 8,335,993 B1 * 12/2012 Tan ..................... G06F 3/04886
715/773
D684,154 S   6/2013 Schontag
(Continued)

FOREIGN PATENT DOCUMENTS

KR    20130002590 A    1/2013
KR    20150133937 A    12/2015

OTHER PUBLICATIONS

Subasi et al., "EEG signal classification using PCA, ICA, LDA and support vector machines", Expert Systems with Applications, vol. 37, 2010, pp. 8659-8666.
(Continued)

*Primary Examiner* — Antonio Xavier
(74) *Attorney, Agent, or Firm* — KPPB LLP (57) ABSTRACT

Systems and methods for using virtual keyboards for high dimensional controllers in accordance with embodiments of the invention are illustrated. One embodiment includes a virtual keyboard system including a processor, and a memory, including a virtual keyboard application, where the virtual keyboard application directs the processor to display a plurality of 3D keys in a virtual environment, where each 3D key represents at least one symbol via a display device, display a cursor in the virtual environment, where the cursor is movable in at least three dimensions via the display device, obtain a user input data from an input device, move the cursor to a 3D key in the plurality of 3D keys based on the user input data, and record the at least one symbol represented by the 3D key.

16 Claims, 6 Drawing Sheets
(3 of 6 Drawing Sheet(s) Filed in Color)

(51) Int. Cl.
  *G06F 3/01* (2006.01)
  *G06F 3/02* (2006.01)
(52) U.S. Cl.
  CPC .......... *G06F 3/0216* (2013.01); *G06F 3/0236* (2013.01); *G06F 3/0237* (2013.01); *G06F 3/04883* (2013.01)

(56) References Cited

U.S. PATENT DOCUMENTS

| | | | |
|---|---|---|---|
| 8,949,743 B2* | 2/2015 | Kida | G06F 3/0234 715/773 |
| 10,223,634 B2 | 3/2019 | Sussillo et al. | |
| 2003/0056278 A1 | 3/2003 | Kuo et al. | |
| 2003/0105409 A1 | 6/2003 | Donoghue et al. | |
| 2004/0073414 A1 | 4/2004 | Bienenstock et al. | |
| 2004/0267320 A1 | 12/2004 | Taylor et al. | |
| 2005/0017870 A1 | 1/2005 | Allison et al. | |
| 2005/0228515 A1 | 10/2005 | Musallam et al. | |
| 2006/0274060 A1* | 12/2006 | Ni | G06F 3/0482 345/419 |
| 2009/0167706 A1* | 7/2009 | Tan | G06F 3/04883 345/173 |
| 2010/0241993 A1* | 9/2010 | Chae | G06F 3/0488 715/830 |
| 2010/0274746 A1 | 10/2010 | Rickert et al. | |
| 2010/0280403 A1 | 11/2010 | Erdogmus et al. | |
| 2011/0092842 A1 | 4/2011 | Decaria et al. | |
| 2011/0224572 A1 | 9/2011 | Gilja et al. | |
| 2011/0307079 A1 | 12/2011 | Oweiss et al. | |
| 2012/0030696 A1 | 2/2012 | Smith | |
| 2012/0130266 A1 | 5/2012 | Mathan et al. | |
| 2012/0242659 A1* | 9/2012 | Sun | G06F 3/04886 345/419 |
| 2013/0311412 A1 | 11/2013 | Lazar et al. | |
| 2013/0314320 A1* | 11/2013 | Hwang | G06F 3/0346 345/158 |
| 2014/0132519 A1* | 5/2014 | Chun | G06F 3/04886 345/168 |
| 2014/0194720 A1 | 7/2014 | Hua | |
| 2015/0120777 A1* | 4/2015 | Ramos | G06F 16/248 707/776 |
| 2015/0124063 A1* | 5/2015 | Woods | H04N 13/117 348/56 |
| 2015/0248234 A1* | 9/2015 | Chen | G06F 3/04886 715/773 |
| 2015/0268814 A1* | 9/2015 | Wang | G06F 1/1626 715/773 |
| 2015/0269336 A1 | 9/2015 | Duan et al. | |
| 2016/0048753 A1 | 2/2016 | Sussillo et al. | |
| 2017/0042440 A1 | 2/2017 | Even-Chen et al. | |
| 2017/0139587 A1* | 5/2017 | Bostick | G06F 3/016 |
| 2017/0344220 A1* | 11/2017 | Cook | G06F 3/04842 |
| 2018/0101239 A1* | 4/2018 | Yin | G06F 3/011 |
| 2019/0205731 A1 | 7/2019 | Sussillo et al. | |

OTHER PUBLICATIONS

Suppes et al., "Brain Wave Recognition of Words", Proceedings of the National Academy of Sciences, vol. 94, No. 26, Dec. 23, 1997, 5 pgs.
Sussillo et al., "A recurrent neural network for closed-loop intracortical brain-machine interface decoders", Journal of Neural Engineering, vol. 9, No. 2, Mar. 19, 2012, 11 pgs.
Sussillo et al., "Making brain-machine interfaces robust to future neural variability", Nature Communications, vol. 7, No. 13749, Dec. 13, 2016, 12 pgs.
Sutskever et al., "Generating Text with Recurrent Neural Networks", Proceedings of the 28th International Conference on Machine Learning (ICML-11). 2011, 8 pgs.
Tankus et al., "Structured Neuronal Encoding and Decoding of Human Speech Features", HHS Public Access—Author Manuscript, published in final form as Nature Communications, vol. 3, 2012, 11 pgs.
Taylor et al., "Direct Cortical Control of 3D Neuroprosthetic Devices", Science, vol. 296, No. 5574, Jun. 7, 2002, pp. 1829-1832.
Towle et al., "ECoG Gamma Activity During a Language Task: Differentiating Expressive and Receptive Speech Areas", Brain, vol. 131, No. 8, Aug. 2008, pp. 2013-2027.
Trautmann et al., "Accurate Estimation of Neural Population Dynamics Without Spike Sorting", bioRxiv, Dec. 5, 2017, 42 pgs.
Vainio et al., "Shared Processing of Planning Articulatory Gestures and Grasping", Experimental Brain Research, vol. 232, No. 7, Jul. 2014, pp. 2359-2368.
Velliste et al., "Cortical control of a prosthetic arm for self-feeding", Nature, vol. 453, No. 7198, Jun. 19, 2008, pp. 1098-1101.
Venkatagiri, "Clinical measurement of rate of reading and discourse in young adults", Journal of Fluency Disorders, vol. 24, No. 3, Sep. 1999, pp. 209-226.
Waldert et al., "Influence of Spiking Activity on Cortical Local Field Potentials", The Journal of Physiology, vol. 591, No. 21, 2013, pp. 5291-5303.
Wang et al., "P300 Brain-Computer Interface Design for Communication and Control Applications", Proceedings of the IEEE International Conference of Engineering in Medicine and Biology, vol. 2005, Sep. 1-4, 2005, 4 pgs.
Willett et al., "Improving Brain-Machine Interface Performing by Decoding Intended Future Movements", NIH Public Access—Author Manuscript, published in final form as J. Neural Engineering, vol. 10, No. 2, Apr. 2013, E-Publication Feb. 21, 2013, 27 pgs.
Wise et al., "Premotor and Parietal Cortex: Corticocortical Connectivity and Combinatorial Computations", Annu. Rev Neuroscience, vol. 20, 1997, pp. 25-42.
Yang et al., "Sensorimotor Experience and Verb-Category Mapping in Human Sensory, Motor and Parietal Neurons", HHS Public Access—Author Manuscript, published in final form as Cortex, vol. 92, Jul. 2017, 29 pgs.
Zhang et al., "Converting Your Thoughts to Texts: Enabling Brain Typing via Deep Feature Learning of EEG Signals", arXiv: 1709.08820, Sep. 26, 2017, 10pgs.
Hochberg et al., "Reach and grasp by people with tetraplegia using a neurally controlled robotic arm", Nature, vol. 485, No. 7398, May 17, 2012, pp. 372-375.
Hoggan et al., "Investigating the Effectiveness of Tactile Feedback for Mobile Touchscreens", Proceedings of the SIGCHI Conference on Human Factors in Computing Systems, Florence, Italy, Apr. 5-10, 2008, pp. 1573-1582.
Homer et al., "Sensors and Decoding for Intracortical Brain Computer Interfaces", Annual Review of Biomedical Engineering, vol. 15, Jul. 2013, 25 pgs.
Jarosiewicz et al., "Virtual typing by people with tetraplegia using a self-calibrating intracortical brain-computer interface", Science Translational Medicine, vol. 7, No. 313, Nov. 11, 2015, 11 pgs.
Jozefowicz et al., "Exploring the Limits of Language Modeling", arXiv:1602.02410v2, Feb. 11, 2016, 11 pgs.
Kao et al., "A High-Performance Neural Prosthesis Incorporating Discrete State Selection Wth Hidden Markov Models", IEEE Transactions on Biomedical Engineering, vol. 64, No. 4, Apr. 2017, pp. 935-945.
Kao et al., "Information Systems Opportunities in Brain-Machine Interface Decoders", Proceedings of the IEEE, vol. 102, No. 5, May 2014, 17 pgs.
Kao et al., "Single-trial dynamics of motor cortex and their applications to brain-machine interfaces", Nature Communications, vol. 6, No. 7759, Jul. 29, 2015, 12 pgs.
Kellis et al., "Decoding Spoken Words Using Local Field Potentials Recorded from the Cortical Surface", NIH Public Access—Author Manuscript, published in final form as Journal of Neural Engineering, vol. 7, No. 5, Oct. 2010, 20 pgs.
Kim et al., "Neural control of computer cursor velocity by decoding motor cortical spiking activity in humans with tetraplegia", Journal of neural engineering, vol. 5, No. 4, Dec. 2008, pp. 455-476.

(56) References Cited

OTHER PUBLICATIONS

Krusienski et al., "Control of a Visual Keyboard Using an Electrocorticographic Brain-Computer Interface", Neurorehabilitation and Neural Repair, vol. 25, No. 4, May 2011, pp. 323-331, doi:10.1177/1545968310382425.

Lau et al., "A Special Virtual Keyboard for Disabled Computer Users", Proceedings of the International MultiConference of Engineers and Computer Scientists, vol. 1, Mar. 15-17, 2017, 6 pgs.

Leuthardt et al., "Using the Electrocorticographic Speech Network to Control a Brain-Computer Interface in Humans", NIH Public Access—Author Manuscript, published in final form as Journal of Neural Engineering, vol. 8, No. 3, Jun. 2011, 22 pgs.

Llera, "Adaptive Classification on Brain-Computer Interfaces Using Reinforcement Signals", Neural Computation, vol. 24, No. 11, 2012, 39 pgs.

Lopez et al., "Text entry with the Apple iPhone and the Nintendo Wii", Proceedings of the Twenty-Seventh Annual SIGCHI Conference on Human Factors in Computing Systems, Boston, USA, Apr. 4-9, 2008.

Lotte et al., "Electrocorticographic Representations of Segmental Features in Continuous Speech", Frontiers in Human Neuroscience, vol. 9, No. 97, Feb. 24, 2015, 13 pgs.

Mackenzie et al., "Text Entry for Mobile Computing: Models and Methods, Theory and Practice", Human-Computer Interaction, vol. 17, No. 2-3, Sep. 2002, pp. 147-198.

Makin, "Brain-Computer Interface Allows Speediest Typing to Date", Scientific American, Feb. 21, 2017, 5pgs.

Malik et al., "Efficient Decoding with Stead-State Kalman Filter in Neural Interface Systems", NIH Public Access—Author Manuscript, published in final form as IEEE Trans Neural System Rehabilitation Engineering, vol. 19, No. 1, Feb. 2011, 25 pgs.

Martin et al., "Decoding Spectrotemporal Features of Overt and Covert Speech from the Human Cortex", Front Neuroengineering, vol. 7, No. 14, May 27, 2014, 15 pgs.

Mayaud et al., "Robust Brain-computer interface for virtual Keyboard (RoBIK): project results", IRBM, Elsevier Masson, vol. 34, No. 2, 2013, pp. 131-138.

Meister et al., "Motor Cortex Hand Area and Speech: Implications for the Development of Language", Neuopsychologia, vol. 41, No. 4, 2003, pp. 401-406.

Moritz et al., "Direct control of paralysed muscles by cortical neurons", Nature, vol. 456, No. 7222, Dec. 4, 2008, 20 pgs.

Mugler et al., "Direct Classification of all American English Phonemes Using Signals from Functional Speech Motor Cortex", NIH Public Access—Author Manuscript, published in final form as Journal of Neural Engineering, vol. 11, No. 3, Jun. 2014, 16 pgs.

Mulliken et al., "Decoding Trajectories from Posterior Parietal Cortex Ensembles", Journal of Neuroscience, vol. 28, No. 48, Nov. 26, 2008, pp. 12913-12926.

Musallam et al., "Cognitive Control Signals for Neural Prosthetics", Science, vol. 305, No. 5681, Jul. 9, 2004, pp. 258-262.

Nguyen et al., "Inferring Imagined Speech using EEG Signals: A New Approach Using Riemannian Manifold Features", Journal of Neural Engineering, vol. 15, No. 1, 2017, 16 pgs.

Noorzadeh et al., "Beyond 2D for brain-computer interfaces: two 3D extensions of the P300-speller", Proceedings of the IEEE International Conference on Acoustics, Speech, and Signal Processing, May 2014, pp. 5940-5944.

Nuyujukian et al., "A High-Performance Keyboard Neural Prosthesis Enabled by Task Optimization", IEEE Transactions on Biomedical Engineering, vol. 62, No. 1, Jan. 2015, early publication Sep. 4, 2014, pp. 21-29.

Nuyujukian et al., "A Nonhuman Primate Brain-Computer Typing Interface", Proceedings of the IEEE, vol. 105, No. 1, Jan. 2017, pp. 66-72.

Nuyujukian et al., "Monkey Models for Brain-Machine Interfaces: The Need for Maintaining Diversity", 33rd Annual International Conference of the IEEE EMBS, vol. 2011, Aug. 30-Sep. 3, 2011, 5 pgs.

Orhan et al., "RSVP Keyboard: An EEG Based Typing Interface", Proceedings of the IEEE International Conference of Acoustics Speech and Signal Processing, Sep. 12, 2013, 11 pgs.

Orsborn et al., "Closed-Loop Decoder Adaptation Shapes Neural Plasticity for Skillful Neuroprosthetic Control", Neuron, vol. 82, No. 6, Jun. 2014, pp. 1380-1393.

Pandarinath et al., "High performance communication by people with paralysis using an intracortical brain-computer interface", eLife, vol. 6, Feb. 21, 2017, 27 pgs.

Paninski et al., "Neural data science: accelerating the experiment-analysis-theory cycle in large-scale neuroscience", Current Opinion in Neurobiology, vol. 50, Jun. 2018, pp. 232-241.

Ramsey et al., "Decoding Spoken Phonemes from Sensorimotor Cortex with High-Density ECoG Grids", Neuroimage, vol. 180, Oct. 2018, 11 pgs.

Ryu et al., "Human cortical prostheses: lost in translation?", Neurosurgical Focus, vol. 27, No. 1, 2009, 11 pgs.

Sahin et al., "Sequential Processing of Lexical, Grammatical, and Phonological Information within Broca's Area", NIH Public Access—Author Manuscript, published in final form as Science, vol. 326, No. 5951, Oct. 16, 2009, pp. 445-449.

Santhanam et al., "A high-performance brain-computer interface", Nature, vol. 442, No. 7099, Jul. 13, 2006, pp. 195-198.

Schmidt et al., "Online detection of error-related potentials boosts the performance of mental typewriters", BMC Neuroscience. vol. 13, No. 19, 2012, 13 pgs.

Serruya et al., "Brain-machine interface: Instant neural control of a movement signal", Nature, vol. 416, No. 6877, Mar. 14, 2002, pp. 141-142.

Shadmehr et al., "Error Correction, Sensory Prediction, and Adaptation in Motor Control", Annu Rev Neuroscience, vol. 33, Jan. 2010, pp. 89-108.

Shenoy et al., "Combining Decoder Design and Neural Adaptation in Brain-Machine Interfaces", Neuron, vol. 84, No. 4, Nov. 19, 2014, 16 pgs.

Shenoy et al., "Cortical Control of Arm Movements: A Dynamical Systems Perspective", Annual Rev Neuroscience, vol. 36, Jul. 8, 2013, pp. 337-359.

Simonyan et al., "New Developments in Understanding the Complexity of Human Speech Production", The Journal of Neuroscience, vol. 36, No. 45, Nov. 9, 2016, pp. 11440-11448.

Smith et al., "Optimizing Touchscreen Keyboards for Gesture Typing", Proceedings of the 33rd Annual ACM Conference on Human Factors in Computing Systems, Seoul, Korea, Apr. 18-23, 2015, pp. 3365-3374.

Spuler et al., "Error-related potentials during continuous feedback: using EEG to detect errors of different type and severity", Frontiers in Human Neuroscience, vol. 9, No. 155, Mar. 2015, 10 pgs.

Stavisky et al., "A High Performing Brain-Machine Interface Driven by Low-Frequency Local Field Potentials Alone and Together with Spikes", HHS Public Access—Author Manuscript, published in final form as Journal of Neural Engineering, vol. 12, No. 3, Jun. 2015, 36 pgs.

Stavisky et al., "Decoding Speech from Intracortical Multielectrode Arrays in Dorsal "Arm/Hand Areas" of Human Motor Cortex", Annual Conference of the IEEE Engineering in Medicine and Biology Society, Jul. 2018, 5 pgs.

"Advanced Biosignal Acquisition, Processing and Analysis", g.tec medical engineering GmbH, product catalogue, 2016, 116 pgs.

"User-ready brain-computer interface applications", intendiX, g.tec product catalogue, 2016, pp. 96-97.

Ajiboye et al., "Restoration of reaching and grasping movements through brain-controlled muscle stimulation in a person with tetraplegia: a proof-of-concept demonstration", Lancet, vol. 389, No. 10081, May 6, 2017, Electronic Publication: Mar. 28, 2017, pp. 1821-1830.

Andersen et al., "Selecting the Signals for a Brain-Machine Interface", Current Opinion in Neurobiology, vol. 14, No. 6, Dec. 2004, pp. 720-726.

Anumanchipalli et al., "Intelligible Speech Synthesis from Neural Decoding of Spoken Sentences", bioRxiv, Nov. 29, 2018, 32 pgs.

Artusi et al., "Performance of a Simulated Adaptive BCI Based on Experimental Classification of Movement-Related and Error Poten- (56) References Cited

OTHER PUBLICATIONS tials", IEEE Journal on Emerging and Selected Topics in Circuits and Systems, vol. 1, No. 4, Dec. 2011.
Bacher et al., "Neural Point-and-Click Communication by a Person With Incomplete Locked-In Syndrome", Neurorehabilitation and Neural Repair, vol. 29, No. 5, Nov. 10, 2014, pp. 462-471.
Barrero et al., "Evaluation of Text Entry Methods for Interactive Digital Television Applications with Devices Alternative to Conventional Remote Controls", International Journal of Human-Computer Interaction, vol. 32, No. 10, 2016, pp. 765-776.
Bouchard et al., "Control of Spoken Vowel Acoustics and the Influence of Phoenetic Context in Human Speech Sensorimotor Cortex", The Journal of Neuroscience, vol. 34, No. 38, Sep. 17, 2014, pp. 12662-12677.
Bouchard et al., "Functional Organization of Human Sensorimotor Cortex for Speech Articulation", HHS Public Access—Author Manuscript, 21 pgs., published in final form as Nature, vol. 495, No. 7441, Mar. 21, 2013, pp. 327-332.
Bouchard et al., "Neural Decoding of Spoken Vowels from Human Sensory-Motor Cortex with High-Density Electrocorticography", 36th Annual International Conference of the IEEE Engineering in Medicine and Biology Society, Aug. 26-30, 2014, Chicago, IL.
Bouton et al., "Restoring cortical control of functional movement in a human with quadriplegia", Nature, vol. 533, No. 7602, May 12, 2016, pp. 247-250.
Breshears et al., "A Probabilistic Map of the Human Ventral Sensorimotor Cortex Using Electrical Stimulation", Journal of Neurosurgey, vol. 123, No. 2, Aug. 2015, E Publication May 15, 2015.
Brumberg et al., "Classification of Intended Phoneme Production from Chronic Intracortical Microelectrode Recordings in Speech-Motor Cortex", Frontiers in Neuroscience, vol. 5, May 12, 2011, 2 pgs.
Carmena et al., "Learning to Control a Brain-Machine Interface for Reaching and Grasping by Primates", PLoS Biology, vol. 1, No. 2, Nov. 2003, Electronic Publication: Oct. 13, 2003, pp. 193-208.
Cecotti et al., "One step beyond rows and columns flashes in the P300 speller: a theoretical description", International Journal of Bioelectromagnetism, vol. 13, No. 1, 2010, pp. 39-41.
Chakrabarti et al., "Progress in Speech Decoding from the Electrocorticogram", Biomedical Engineering Letters, vol. 5, No. 1, Mar. 2015, pp. 10-21.
Chan et al., "Decoding Word and Category-Specific Spatiotemporal Representations from MEG and EEG", NIH Public Access—Author Manuscript, 24 pgs., published in final form as Neuroimage, vol. 54, No. 4, Feb. 14, 2011, pp. 3028-3039.
Chan et al., "Speech-Specific Tuning of Neurons in Human Superior Temporal Gyrus", Cerebral Cortex, vol. 24, No. 10, Oct. 2014, pp. 2679-2693.
Chavarriaga et al., "Errare machinale est: the use of error-related potentials in brain-machine interfaces", Frontiers in Neuroscience, vol. 8, Article 208 (2014).
Chestek et al., "Long-term stability of neural prosthetic control signals from silicon cortical arrays in rhesus macaque motor cortex", Journal of neural engineering, 8(4):045005, Jul. 2011.
Cheung et al., "The Auditory Representation of Speech Sounds in Human Motor Cortex", eLife, 2019, 19 pgs.
Chun et al., "BCI based Hybrid Interface for 3D Object Control in Virtual Reality", IEEE International Conference on Brain-Computer Interface, Feb. 22-24, 2016, 4pgs.
Churchland et al., "Techniques for Extracting Single-Trial Activity Patterns from Large-Scale Neural Recordings", Current Opinion in Neurobiology, vol. 17, No. 5, Oct. 2007, pp. 609-618.
Collinger et al., "7 degree-of-freedom neuroprosthetic control by an individual with tetraplegia", NIH Public Access—Author Manuscript, 17 pgs., published in final form as "High-Performance Neuroprosthetic Control by an Individual with Tetraplegia", The Lancet, vol. 381, No. 9866, Feb. 16, 2013, 17 pgs.
Collinger et al., "Functional priorities, assistive technology, and brain-computer interfaces after spinal cord injury", Journal of Rehabilitation Research and Development, vol. 50, No. 2, 2013, pp. 145-160.
Corley et al., "Brain-Computer Interface Virtual Keyboard for Accessibility", University of Alabama: Department of Computer Science, Jun. 2012, 6pgs.
Creutzfeldt et al., "Neuronal Activity in the Human Lateral Temporal Lobe: I. Responses to Speech", Experimental Brain Research, vol. 77, No. 3, 1989, pp. 451-475.
Cunningham et al., "A closed-loop human simulator for investigating the role of feedback control in brain-machine interfaces", Journal of neurophysiology, 105(4):1932-1949, Apr. 2011.
Daffau et al., "The Role of Dominant Premotor Cortex in Language: A Study Using Intraoperative Functional Mapping in Awake Patients", Neuroimage, vol. 20, No. 4, Dec. 2003, pp. 1903-1914.
Downey et al., "Blending of brain-machine interface and vision-guided autonomous robotics improves neuroprosthetic arm performance during grasping", Journal of NeuroEngineering and Rehabilitation, vol. 13, No. 28, Mar. 18, 2016, 12 pgs.
Einevoll et al., "Modelling and Analysis of Local Field Potentials for Studying the Function of Cortical Circuits", Nature Review Neuroscience, vol. 14, No. 11, Nov. 2013, pp. 770-785.
Ethier et al., "Restoration of grasp following paralysis through brain-controlled stimulation of muscles", Nature, vol. 485, No. 7398, May 17, 2012, pp. 368-371.
Even-Chen et al., "Augmenting intracortical brain-machine interface with neurally driven error detectors", Journal of Neural Engineering, vol. 14, No. 6, Nov. 10, 2017, 16 pgs.
Even-Chen et al., "Auto-Deleting Brain Machine Interface: Error Detection Using Spiking Neural Activity in the Motor Cortex", 37th Annual International Conference of the IEEE Engineering in Medicine and Biology Society, Aug. 25-29, 2015, Milan, Italy, 5 pgs.
Even-Chen et al., "Feasibility of Automatic Error Detect-and-Undo System in Human Intracortical Brain-Computer Interfaces", IEEE Transactions on Biomedical Engineering, vol. 65, No. 8, Aug. 2018, pp. 1771-1784.
Fan et al., "Intention Estimation in Brain-Machine Interfaces", NIH Public Access—Author Manuscript, 28 pgs., published in final form as Journal Neural Engineering, vol. 11, No. 1, Feb. 2014.
Ferrez et al., "EEG-Based Brain-Computer Interaction: Improved Accuracy by Automatic Single-Trial Error Detection", Advances in Neural Information Processing Systems 20, 2007, 8 pgs.
Ferrez et al., "Simultaneous Real-Time Detection of Motor Imagery and Error-Related Potentials for Improved BCI Accuracy", In proceedings of the 4th Inti. Brain-Computer Interface Workshop and Training Course (2008).
Fowler et al., "Improved inference and autotyping in EEG-based BCI typing systems", Proceedings of the ACM SIGACCESS Conference on Computers and Accessibility, Oct. 21-23, 2013, 8pgs.
Ganguly et al., "Emergence of a Stable Cortical Map for Neuroprosthetic Control", PLoS Biology, vol. 7, No. 7, Jul. 21, 2009, e1000153, 13 pgs.
Gilja et al., "A High-Performance Neural Prosthesis Enabled by Control Algorithm Design", Nature Neuroscience, vol. 15, No. 12, Dec. 2012, Published Online: Nov. 18, 2012, pp. 1752-1757.
Golub et al., "Internal Models Engaged by Brain-Computer Interface Control", NIH Public Access—Author Manuscript, 11 pgs., published in final form as 34th Annual International Conference of the IEEE EMBS, vol. 2012, 2012, pp. 1327-1330.
Guenther et al., "A Wireless Brain-Machine Interface for Real-Time Speech Synthesis", PLoS One, vol. 4, No. 12, Dec. 9, 2009, 11 pgs.
Herff et al., "Automatic Speech Recognition from Neural Signals: A Focused Review", Front Neuroscience, vol. 10, No. 429, Sep. 2016, pp. 1-7.
Herff et al., "Brain-to-text: decoding spoken phrases from phone representations in the brain", Frontiers in Neuroscience, vol. 9, No. 217, Jun. 12, 2015, 11 pgs.
Hill et al., "Recording Human Electrocorticographic (ECoG) Signals for Neuroscientific Research and Real-time Functional Cortical Mapping", Journal of Visualized Experiments, 2012, vol. 64.

(56) References Cited

OTHER PUBLICATIONS

Hochberg et al., "Neuronal ensemble control of prosthetic devices by a human with tetraplegia", Nature, vol. 442, No. 7099, Jul. 13, 2006, pp. 164-171.

* cited by examiner

SYSTEMS AND METHODS FOR VIRTUAL KEYBOARDS FOR HIGH DIMENSIONAL CONTROLLERS

CROSS-REFERENCE TO RELATED APPLICATIONS

The current application claims the benefit of and priority under 35 U.S.C. § 119(e) to U.S. Provisional Patent Application No. 62/752,280 entitled "Systems and Methods for Virtual Keyboards for High Dimensional Controllers" filed Oct. 29, 2018. The disclosure of U.S. Provisional Patent Application No. 62/752,280 is hereby incorporated by reference in its entirety for all purposes.

STATEMENT OF FEDERALLY SPONSORED RESEARCH

This invention was made with Government support under contract W911NF-14-2-0013 awarded by the Defense Advanced Research Projects Agency and under contract DC014034 awarded by the National Institutes of Health. The Government has certain rights in the invention.

FIELD OF THE INVENTION

The present invention generally relates to virtual keyboards for high dimensional controllers and, more specifically, enhanced methods for constructing virtual keyboards to increase usage efficiency.

BACKGROUND

The invention of the typewriter revolutionized the written word. Perhaps the most recognizable keyboard layout is the QWERTY layout found today on the majority of modern computing systems has been used since the late 1800s. Keyboards today enable users to interface physically with a computing device by inputting specific symbols that are assigned to each key. Most commonly, by pressing a key, a circuit is completed which causes the input of the symbol assigned to the pressed key into the digital system.

Brain-computer interfaces (BCIs), also known as brain-machine interfaces (BM's), mind-machine interfaces (MMIs), direct neural interfaces (DNIs), or neural-control interfaces (NCIs), read brain signals generated in a user and convert them into machine-usable signals. BCIs can be invasive (having an implanted component) or non-invasive (no implanted components). For example, electroenecephalography (EEG) has been used as a non-invasive BCI, often involving the recording of P300 signals.

SUMMARY OF THE INVENTION

Systems and methods for using virtual keyboards for high dimensional controllers in accordance with embodiments of the invention are illustrated. One embodiment includes a virtual keyboard system including a processor, and a memory, including a virtual keyboard application, where the virtual keyboard application directs the processor to display a plurality of 3D keys in a virtual environment, where each 3D key represents at least one symbol via a display device, display a cursor in the virtual environment, where the cursor is movable in at least three dimensions via the display device, obtain a user input data from an input device, move the cursor to a 3D key in the plurality of 3D keys based on the user input data, and record the at least one symbol represented by the 3D key.

In another embodiment, at least one 3D key in the plurality of 3D keys is segmented into a plurality of regions, and each region represents at least one symbol.

In a further embodiment, the virtual keyboard application further directs the processor to rotate the cursor based on the user input data.

In still another embodiment, the virtual keyboard application further directs the processor to rotate the plurality of 3D keys around a fixed point based on the user input data.

In a still further embodiment, the virtual keyboard application further directs the processor to rotate each key in the plurality of 3D keys around a center point of each respective key based on the user input data.

In yet another embodiment, the plurality of 3D key objects are arranged in a face centered cubic structure.

In a yet further embodiment, the input device is a brain-computer interface, and wherein the user input data includes brain signal data.

In a further additional embodiment, the input device is a motion tracking system.

In another embodiment again, the display device displays a 2D representation of the virtual environment from at least one given viewpoint.

In a further embodiment again, each 3D key is a sphere.

In still yet another embodiment, a method for typing using a virtual keyboard, includes displaying a plurality of 3D keys in a virtual environment via a display device, where each 3D key object represents at least one symbol, displaying a cursor in the virtual environment via the display device, where the cursor is movable in at least three dimensions, obtaining user input data from an input device, moving the cursor to a 3D key in the plurality of 3D key based on the user input data, and recording the at least one symbol represented by the 3D key.

In a still yet further embodiment, at least one 3D key in the plurality of 3D key objects is segmented into a plurality of regions, and each region represents at least one symbol.

In still another additional embodiment, the method further includes rotating the cursor based on the user input data.

In a still further additional embodiment, the method further includes rotating the plurality of 3D keys around a fixed point based on the user input data.

In still another embodiment again, rotating each key in the plurality of 3D keys around a center point of each respective key based on the user input data.

In a still further embodiment again, the plurality of 3D keys are arranged in a face centered cubic structure.

In yet another additional embodiment, the input device is a brain-computer interface, and wherein the user input data includes brain signal data.

In a yet further additional embodiment, the input device is a motion tracking system.

In yet another embodiment again, the display device displays a 2D representation of the virtual environment from at least one given viewpoint.

In a yet further embodiment again, each 3D key is a sphere.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

DETAILED DESCRIPTION

Increasingly, the ability to interface with machines is becoming a necessity for modern life. However, the predominant methods for interfacing with machines are physical. For example, personal computers utilize keyboards as common interfaces. Increasingly common too are voice based interfaces where audio processing techniques are used to understand and extract verbal commands from users. However, there is a significant portion of the population that is incapable of using physical interfaces, or otherwise prevented from using them efficiently. For example, those suffering from quadriplegia may be unable to use physical keyboards and mice.

Recent advances in interface technology have resulted in interfaces that attempt to compensate for physical disabilities. For example, motion tracking systems, such as, but not limited to, eye tracking and head tracking systems can be useful for those who have difficulty with finger movement. In some cases, motion tracking systems can be supplemented or supplanted by brain-computer interfaces (BCIs). BCIs are capable of recording brain activity and translating the intention of the user into prosthetic movement. For example, when a user thinks of moving a computer cursor to the right, the BCI system can recognize the brain activity patterns that correlate with that intention and trigger the cursor to move in the desired direction. However, while interface technology has changed, the notion of a keyboard has remained largely static. The common typing paradigm for cursor typing using BCIs, eye-tracking, and head-tracking, a cursor is moved over a desired key in a 2D grid (similar to a physical keyboard), and the key is selected by dwelling on the key for a predefined period, or by 'clicking' the key with an additional action. However, these conventional methods are much slower and more prone to errors when compared to 10-digit typing using a physical keyboard. Cursor typing can be frustrating and devastating to users when the typing rate is too slow.

A key problem with cursor typing is the control of only '1-digit' (i.e. the single cursor) as opposed to 10 simultaneous digits utilized in physical typing. In contrast, interface devices in accordance with certain embodiments of the invention are capable of translating brain signals into at least three directional dimensions (x, y, z). Further, in many embodiments, a fourth orientation dimension possible. That is, not only can an object be moved along each axis, but the object can have a manipulable orientation in the three dimensional (3D) space (for example, but without limitation, rotation). By increasing the dimensionality of the inputs, a higher information throughput can be achieved. However, in order to achieve the benefit of high-dimensional input, a new keyboard layout and design is useful.

Turning now to the drawings, systems and methods for virtual keyboards for high dimensional controllers are described. Here, "high-dimensional" refers to the capability to provide at least three dimensions of input corresponding to at least three degrees of freedom of movement for usage in selecting keys. In many embodiments, virtual keyboards for high dimensional controllers are made of 3D virtual objects in a three dimensional virtual space. Virtual keyboards for high dimensional controllers can be displayed in at least two dimensions (2D). For example, in some embodiments, virtual keyboards for high dimensional controllers are displayed in 2D by rendering a 2D view of the 3D virtual space corresponding to a user's viewpoint on a particular 2D display device. Therefore, it is to be understood that while key objects and cursors are referred to herein as 3D, they can be displayed as 2D representations from a given viewpoint on a display device. Where conventional virtual keyboards utilize a 2D matrix layout of keys often with two degrees of freedom (movement along x and y axes), systems and methods described herein generate and utilize virtual keyboards for high dimensional controllers that can increase typing speed and reduce input errors.

When attempting to increase efficiency and take advantage of high-dimensional inputs, it can be desirable to reduce the average reach time between keys (i.e. reduce the amount of time the cursor is not selecting a key). Two ways are discussed below in which to reduce average reach time. First, the physical location of the keys can be selected to reduce the amount of space between them. Second, the key labeling (which symbol is assigned to which key) can be made to assign more commonly used keys in closer proximity to each other. Key labeling is often a function of what language is being utilized, and there can be a degree of personal preference involved. However, languages can impact key placement as well.

While virtual keyboards for high dimensional controllers can be used to assist those who are unable to efficiently type physically due to physical disability, virtual keyboards for high dimensional controllers can also be useful in situations where traditional physical keyboards are unavailable or unwieldy. As virtual keyboards for high dimensional controllers can increase typing speed compared to conventional virtual keyboards when physical keyboards cannot be used, virtual keyboards for high dimensional controllers can be utilized to increase user's typing speeds in any number of situations. For example, in video gaming environments where game controllers are the predominant interface device, virtual keyboards for high dimensional controllers can be used to increase input speed. Further, virtual keyboards for high dimensional controllers can be an efficient method of input for virtual reality systems (e.g. where pointers are used connected to a person's hand held controllers), or for television inputs where a television remote (e.g. a "clicker") is used. Indeed, virtual keyboards for high dimensional controllers can be used in any environment where physical keyboards are unavailable or cumbersome to use. Different constructions of virtual keyboards for high dimensional controllers are discussed below.

Virtual Keyboards for High Dimensional Controllers

In many embodiments, in order to leverage high-dimensional input, keys in virtual keyboards for high dimensional controllers are placed in arrangements that minimize the distance between them in at least three dimensions. Indeed, while it can be useful to densely pack keys, it is often preferable for each key to be visible to the user at all times. To achieve this, virtual keyboards for high dimensional controllers described herein utilize 3D keys in a face-centered cubic lattice, which balances both dense packing and visibility, as the center of each key is visible at least up to three layers. As such, many virtual keyboards for high dimensional controllers described herein are between one and three layers. However, any number of layers can be used based on user preference and/or language as appropriate to the requirements of specific applications of embodiments of the invention. For each number of keys required for the resulting virtual keyboard for high dimensional controllers, the optimal subset of locations of 3D keys in the face centered cubic (FCC) lattice can be selected in order to minimize the average distance between keys. While virtual keyboards for high dimensional controllers are discussed below with respect to having spherical keys, any number of shapes (e.g. tetrahedrons, cubes, pentahedrons, other polyhedrons, irregular 3D objects, etc.) can be used as appropriate to the requirements of specific applications of embodiments of the invention.

Figure 1A:
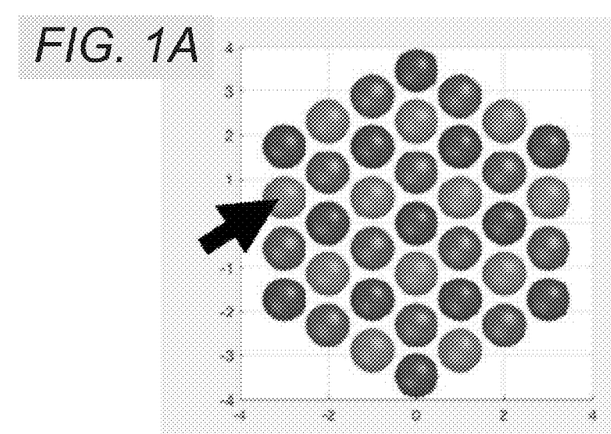
FIGS. 1A and 1B illustrate an example virtual keyboard for high dimensional controllers layout with no assigned symbols from different viewpoints in accordance with an embodiment of the invention.
Figure 1B:
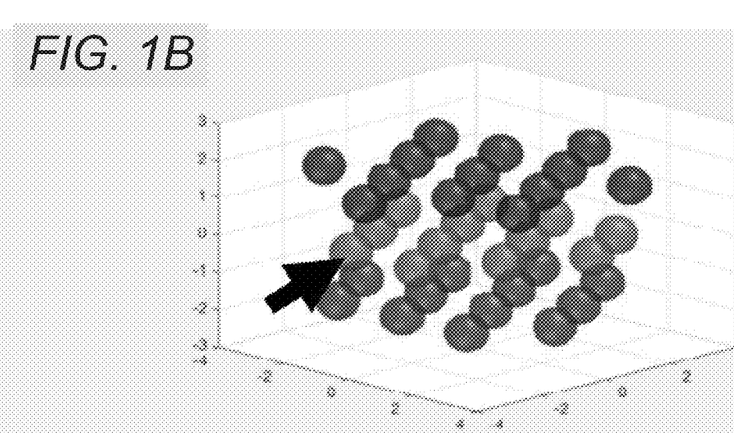
Figure 1C:
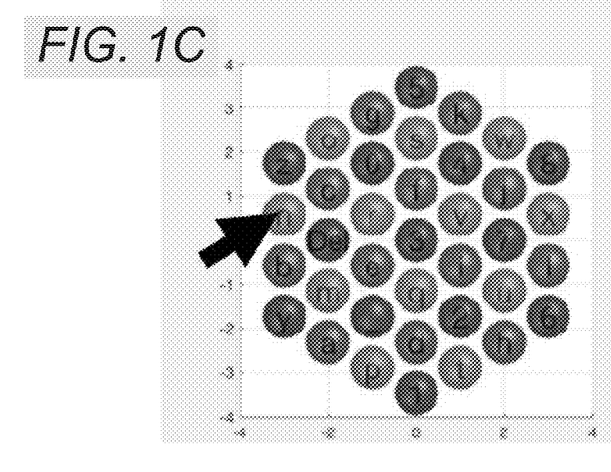
FIGS. 1C and 1D illustrate the example virtual keyboard for high dimensional controllers layout shown in FIGS. 1A and 1B, with an example symbol assignment from different viewpoints in accordance with an embodiment of the invention.
Figure 1D:
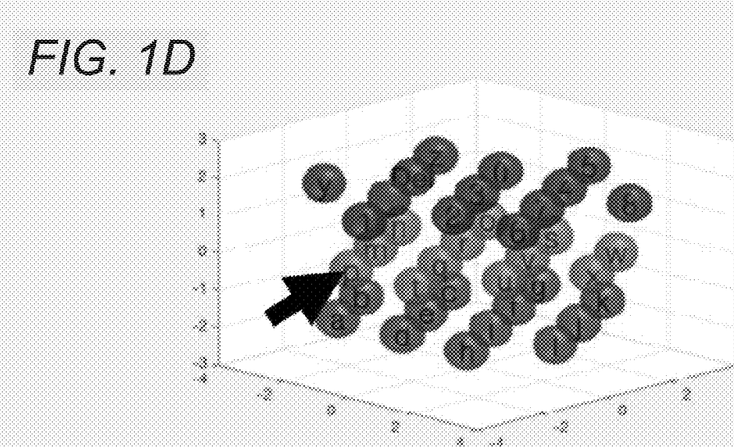

Turning now to FIGS. 1A and 1B, a 3D virtual keyboard with 37 keys in accordance with an embodiment of the invention is illustrated. The three colors represent different layers of the keyboard. Notably, there can be space between the keys added to reduce errors, and the absolute densest packing of spheres is not a requirement. The cursor, represented here by a black arrow but which can take any form desired, can be moved through the 3D environment to select particular keys. Turning now to FIGS. 1C and 1D, a 37 key 3D virtual keyboard with English symbol assignments in accordance with an embodiment is illustrated. In numerous embodiments, the number of keys desired for a particular layout may be insufficient to complete a plane of the lattice. It is not a requirement that each key be placed to conform to the lattice (i.e. remainder keys can be placed in non-uniform positions. In this embodiment, each key represents a single symbol. However, in many embodiments, each key object can represent multiple symbols that can be differentially selected using an orientation dimension.

Figure 2A:
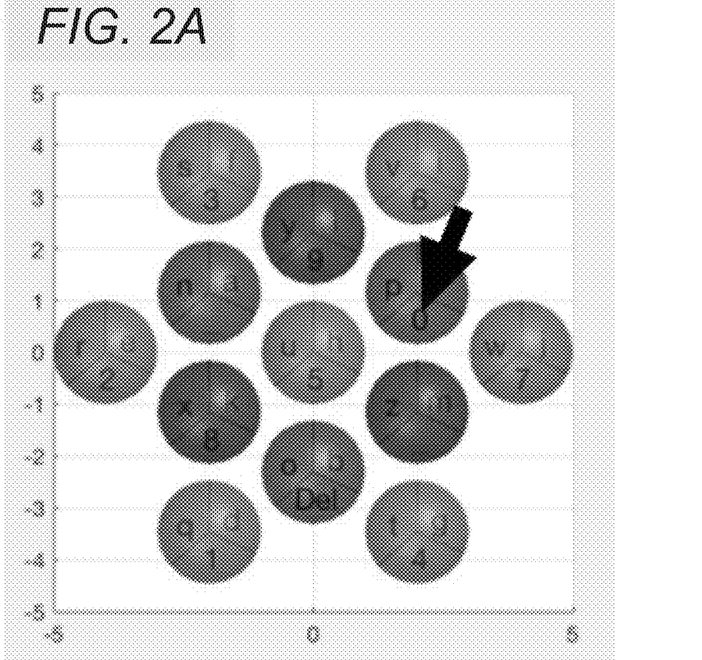
FIGS. 2A and 2B illustrate an example virtual keyboard for high dimensional controllers layout with an example symbol assignment from different viewpoints in accordance with an embodiment of the invention.
Figure 2B:
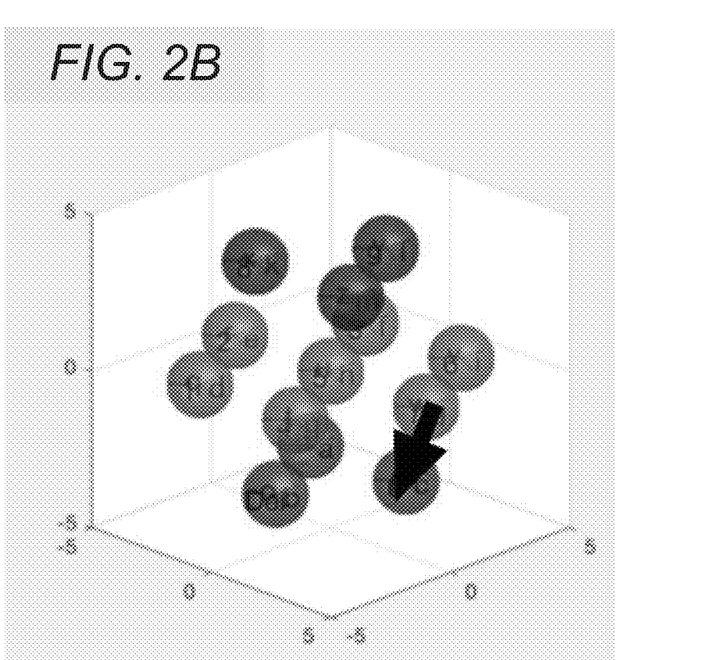
Figure 3:
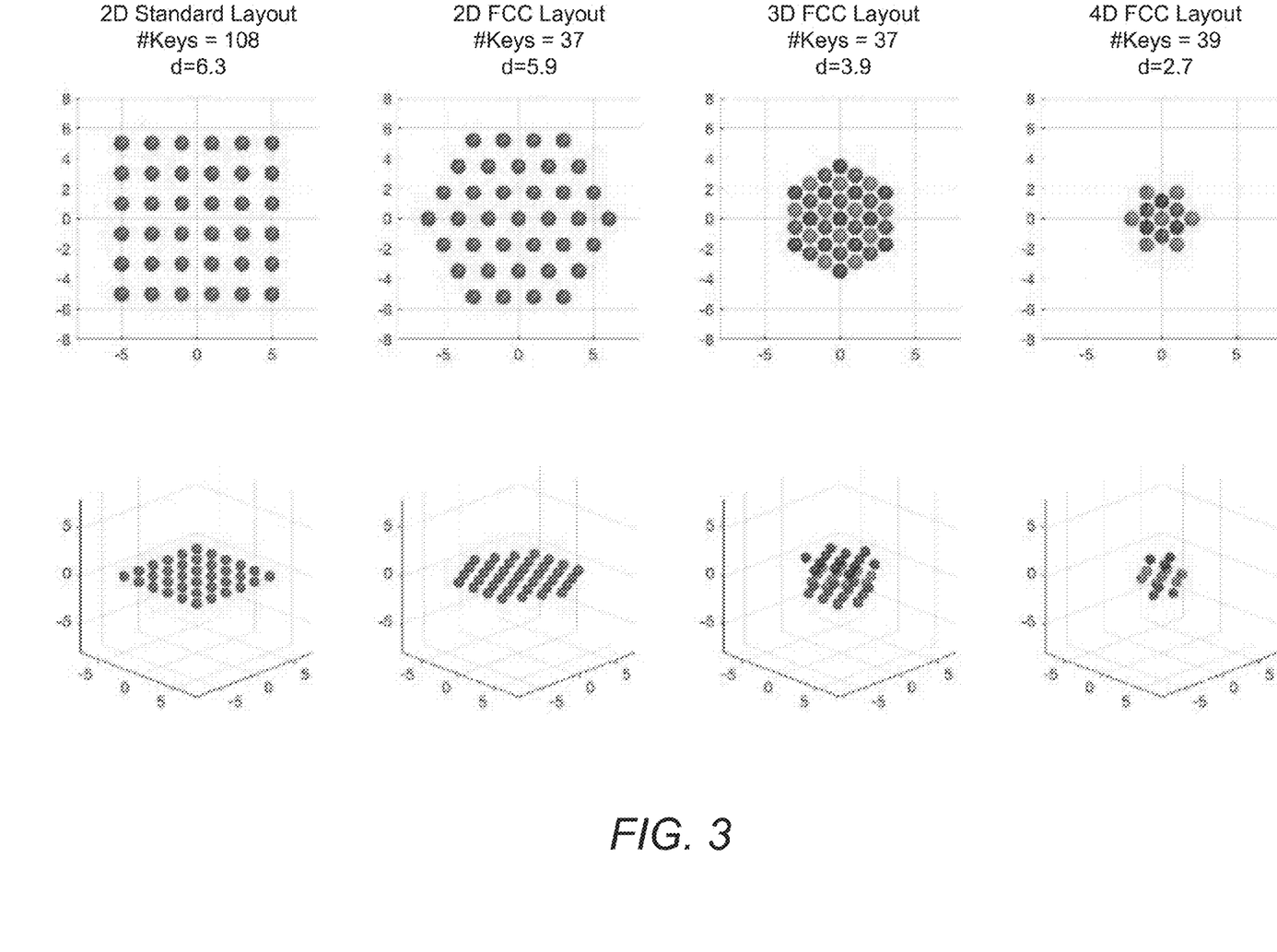
FIG. 3 illustrates a conventional virtual keyboard layout implemented using a virtual keyboard for high dimensional controllers system and three different example virtual keyboard for high dimensional controllers layouts in accordance with an embodiment of the invention.

Turning now to FIGS. 2A and 2B, a 4D virtual keyboard with 13 keys representing 39 symbols in accordance with an embodiment of the invention from two different points of view is illustrated. Using the orientation dimension, different portions of the surface of the sphere can represent different symbols, thereby further densifying the keyboard. In many embodiments, the lattice of keys is rotated based on an orientation input. In a variety of embodiments, the cursor rotates based on an orientation input. In numerous embodiments, the key objects rotate while remaining at a fixed 3D coordinate in virtual space based on an orientation input. While any division of the surface of the sphere can be used, the illustrated embodiment in FIGS. 2A and 2B utilize three different regions for illustrative purposes. In numerous embodiments, the regions extend into the sphere, e.g. as a spherical sector, a spherical cap, a spherical wedge, or any other division of a sphere as appropriate to the requirements of specific applications of embodiments of the invention. As noted above, the key objects do not need to be spheres, and alternative methods for dividing the surface area and/or volume of key objects can be used as appropriate to the requirements of specific applications of embodiments of the invention. From left to right, a comparison of a 2D standard virtual keyboard matrix-style layout implemented using systems and methods described herein, a single layer FCC lattice 3D virtual keyboard, a three layer FCC lattice 3D virtual keyboard, and a three layer FCC 4D virtual keyboard in accordance with an embodiment of the invention is illustrated in FIG. 3. The average distance between keys d (in arbitrary units) is listed above each virtual keyboard. The distance between each key within a layer in the embodiments illustrated in FIG. 3 is standardized at 2 arbitrary units for each virtual keyboard. However, the distance and size of each key can be modified to any number as appropriate to the requirements of an application of a given embodiment of the invention. As shown, the designs cut the average distance between by at least half from the conventional keyboard, and have experimentally demonstrated a doubling in typing rate, thereby increasing the clinical viability of typing technologies for those with disabilities. Systems for generating and utilizing virtual keyboards for high dimensional controllers are discussed below.

High-Dimensional Keyboard Systems

Figure 4:
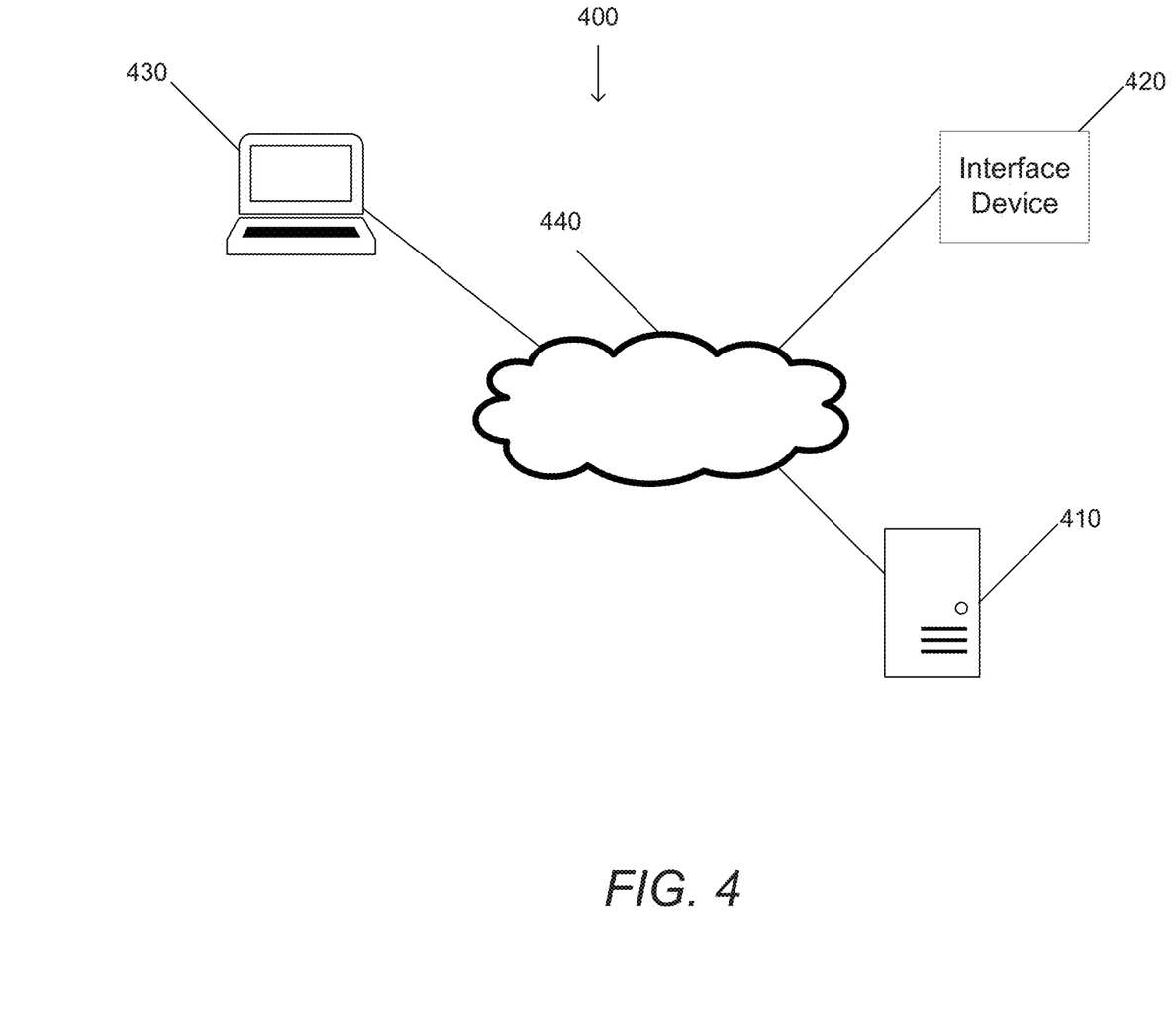
FIG. 4 is a system diagram for a virtual keyboard for high dimensional controllers system in accordance with an embodiment of the invention.

High-dimensional keyboard systems can be utilized to generate and/or display virtual keyboards for high dimensional controllers. In many embodiments, high-dimensional keyboard systems perform virtual keyboard for high dimensional controllers processes. In many embodiments, high-dimensional keyboard systems are incorporated into other computing systems, such as, but not limited to, augmented reality (AR) systems, mixed reality (MR) systems, virtual reality (VR) systems, gaming systems, smart television systems, or any other system as appropriate to the requirements of specific applications of embodiments of the invention. Turning now to FIG. 4, a high-dimensional keyboard system in accordance with an embodiment of the invention is illustrated. System 400 includes a virtual keyboard computing system 410. Virtual keyboard computing system 410 is in communication with an input device 420 and a display device 430 via a network 440. In many embodiments, the input device is a BCI. BCIs can be any BCI capable of translating brain activity into at least three dimensional cursor movement. In some embodiments, the input device is a motion tracking system, such as, but not limited to, an eye tracking and/or head tracking system. However, any number of types of input device can be used as appropriate to the requirements of specific applications of embodiments of the invention, including, but not limited to, game controllers, virtual reality style controllers, television remotes, computer mice, or any other device capable of inputting at least three dimensions of input. In numerous embodiments, more than one input devices are utilized in order to reduce noise in input signals.

In a variety of embodiments the display device is a computer monitor. However, the display device can be any form of display that is capable of displaying a rendered virtual keyboard. Indeed, the display device can be advanced 3D displays such as, but not limited to, VR displays (e.g. Oculus Rift by Facebook, VIVE by HTC, Google Cardboard by Google LLC., etc.), AR displays (e.g. HoloLens by Microsoft), and/or MR displays. In a variety of embodiments, the display device and the virtual keyboard computing system are implemented using the same hardware (e.g. a personal computer). However, any number of computing devices can be used, including, but not limited to, rack servers, smartphones, smart televisions, tablet computers, or any other computing device capable of performing virtual keyboard for high dimensional controllers processes as appropriate to the requirements of specific applications of embodiments of the invention. Further, the network can be any network, wired and/or wireless, capable of transmitting information between components. For example, the network can be, but is not limited to, the Internet, an intranet, a wide area network (WAN), a local area network (LAN) or any other network type as appropriate to the requirements of specific applications of embodiments of the invention.

Figure 5:
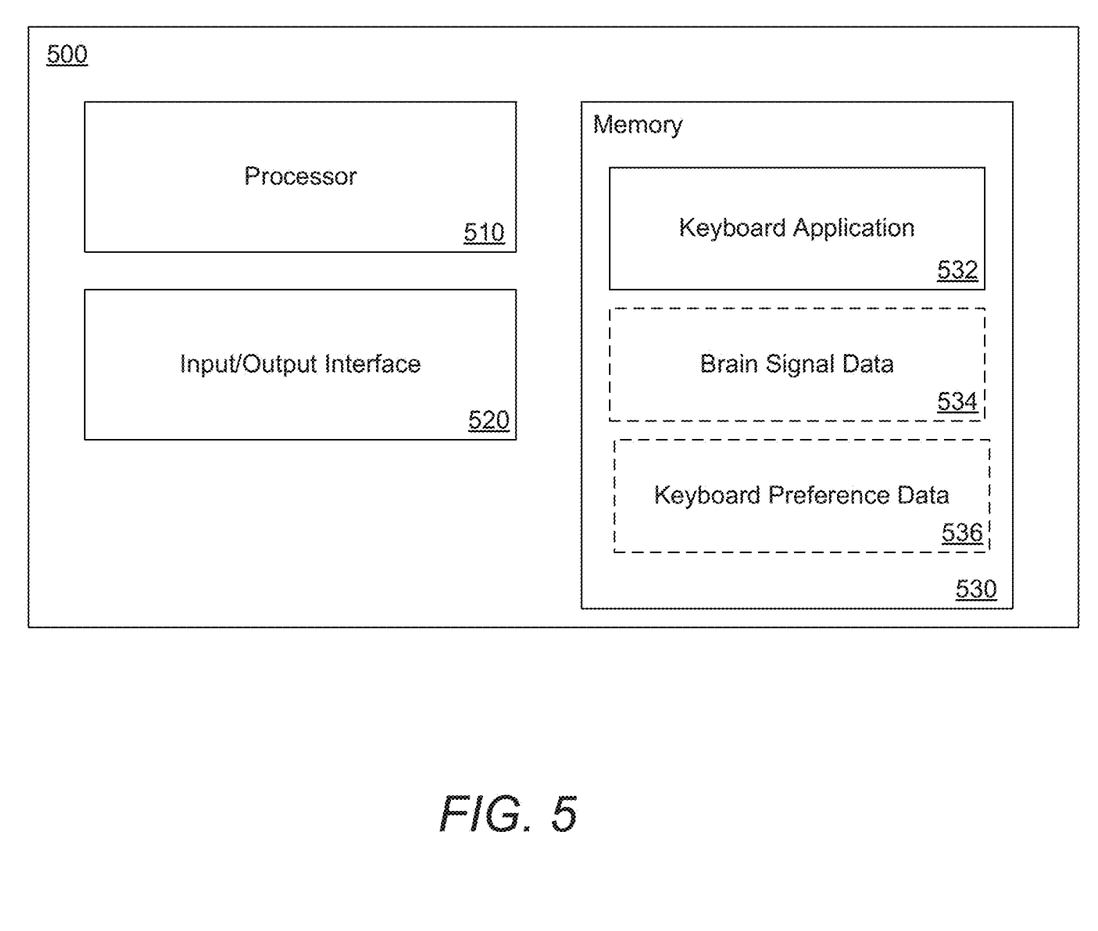
FIG. 5 is a block diagram for a virtual keyboard for high dimensional controllers computing system in accordance with an embodiment of the invention.

Turning now to FIG. 5, a block diagram of a virtual keyboard computing system in accordance with an embodiment of the invention is illustrated. Virtual keyboard computing system 500 includes a processor 510. Processor 510 can be any type of processing unit, including but not limited to, a central processing unit, a graphics processing unit, a field programmable gate array, an application-specific integrated circuit, or any other processing module as appropriate to the requirements of specific applications of embodiments of the invention. Indeed, multiple processing modules can be used in order to provide specialized hardware for different tasks and/or to increase the speed of the system. Virtual keyboard computing system 500 further includes an input/output (IO) interface 520. IO interfaces can communicate with interface devices to obtain user input data. In many embodiments, IO interfaces provide rendering information to a display device. In a variety of embodiments, IO interfaces are used to communicate with other devices via a network.

Virtual keyboard computing system 500 further includes a memory 530. The memory can be any type of memory, either volatile or non-volatile, and can store machine-readable information. Memory 530 contains a keyboard application 532. Keyboard applications can direct processors to perform various virtual keyboard for high dimensional controllers processes. In numerous embodiments, memory 530 contains user input data. User input data can describe user inputs to the virtual keyboard for high dimensional controllers such as, but not limited to, instructions on how the cursor should be moved, whether or not a cursor should be "clicked," and/or any other input information as appropriate to the requirements of specific applications of embodiments of the invention. In numerous embodiments, user input data is brain signal data. Brain signal data can include brain signals recorded from a BCI, and/or machine interpretable instructions based on recorded brain signals (e.g. "move the cursor to the right"). In various embodiments, memory 530 stores keyboard preference data 536. Keyboard preference data can include any user preferences and settings, including, but not limited to, the preferred distance between each sphere, different symbol assignments, different keyboard layouts, language preferences describing a preferred language, color preferences describing which colors should be used in rendering the virtual keyboard, click preferences indicating how key selection should be confirmed, and/or any other preference as appropriate to the requirements of specific applications of embodiments of the invention.

As noted above, virtual keyboard computing systems can be implemented using any computing system capable of performing virtual keyboard for high dimensional controllers processes. Virtual keyboard for high dimensional controllers processes are described below.

Processes for Generating Virtual Keyboards for High Dimensional Controllers

Figure 6:
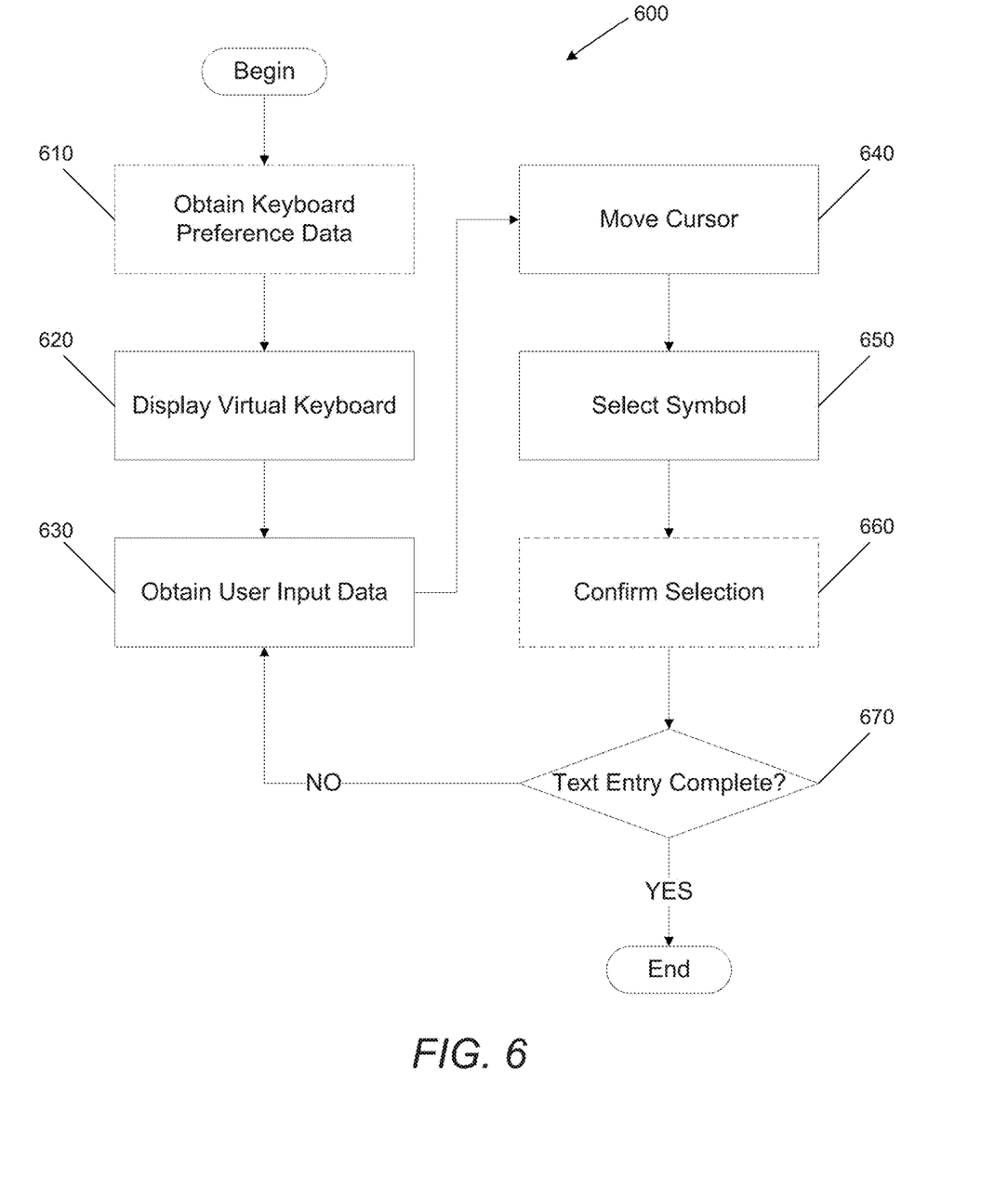
FIG. 6 is a flow chart illustrating a process for generating and using a virtual keyboard for high dimensional controllers in accordance with an embodiment of the invention.

Processes for generating user interfaces that incorporate virtual keyboards for high dimensional controllers typically involve generating a display incorporating a rendering of a virtual keyboard for high dimensional controllers and making observations of the user to determine movement of and selections made by a cursor and/or other pointer. Virtual keyboards for high dimensional controllers can be visually provided to a user and interacted with through virtual keyboard for high dimensional controllers systems in a manner similar to that described above. Turning now to FIG. 6, a process for generating and interacting with a virtual keyboard for high dimensional controllers in accordance with an embodiment of the invention is illustrated.

In many embodiments, process 600 includes obtaining (610) keyboard preference data. Keyboard preference data can be obtained from a user interface device, and can be used to determine how the virtual keyboard for high dimensional controllers should be rendered, the layout of the keys, language, the labeling of the keys, display features, how the virtual keyboard is interfaced with, and/or any other user preference as appropriate to the requirements of specific applications of embodiments of the invention. In many embodiments, display features are the size of 3D key objects, font size, key colorings, key shapes, or any other cosmetic aspect of the virtual keyboard as appropriate to the requirements of specific applications of embodiments of the invention.

Process 600 further includes displaying (620) the virtual keyboard for high dimensional controllers on a display device and obtaining (630) user input data. The process 600 further includes moving (640) a cursor through the virtual keyboard based on the user input data, and selecting (650) a symbol via a key based on the location of the cursor in the keyboard. In many embodiments, the movement of the cursor is in three dimensions. However, in many embodiments, the movement of the cursor is in four dimensions (x, y, z, and orientation). In numerous embodiments, the cursor is moved through the virtual keyboard by moving the keys themselves relative to a fixed cursor location.

In a variety of embodiments, the cursor can be moved in a two dimensional active layer (i.e. in one plane of the lattice), and select targets only in the active layer. Using a 3rd dimension of control, the active layer can be switched. In many embodiments, this is done by highlighting the active layer or by bring the active layer to the front. In other words, the layers can be "pushed" or "pulled" to move between them. Using such a configuration, instead of moving the cursor visually in depth, the visualization itself changes and it appears as if the keyboard is 'moving' or changing. Visualization effects can be applied to clarify transitions. For example, all key objects can be displayed in half transparent gray, and the layer in which the cursor can be colored in a different color (e.g. blue). When the user dwells on a key object from the active layer, the key object's color can change from blue to a third color (e.g. red). However, any number of colors or visualization effects can be used as appropriate to the requirements of an application of a given embodiment of the invention.

In a variety of embodiments, selection of a key can be confirmed (660) by a secondary action. For example, a selection can be confirmed by dwelling on the selected key for a set period of time, inputting a selection confirmation via the input device, and/or any other confirmation method as appropriate to the requirements of specific applications of embodiments of the invention. If text entry is not complete (670), the cursor can be moved and a new symbol can be selected.

In many embodiments, key labeling and/or key arrangements or size can be dynamically reconfigured in response to key selections. For example, keys adjacent to the selected key can be relabeled to indicate symbols that are most likely to be required next via predictive text algorithms and/or other natural language processing methods. Further, symbols are not restricted to single letters, but can also represent strings of letters, including, but not limited to, common string of letters, common prefixes, common suffixes, words, phrases, or any other string as appropriate to the requirements of specific applications of embodiments of the invention. In this way, the average typing speed of the individual can be accelerated.

Although specific systems and methods for generating and using virtual keyboards for high dimensional controllers are discussed above, many different methods can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A virtual keyboard system, comprising:
a processor; and
a memory, comprising a virtual keyboard application, where the virtual keyboard application directs the processor to:
  display a plurality of 3D keys in a virtual environment, where:
    each 3D key represents at least one symbol via a display device; and
    the plurality of 3D keys are arranged in a face centered cubic lattice structure;
  display a cursor in the virtual environment, where the cursor is movable in at least three dimensions via the display device;
  obtain a user input data from a brain-computer interface, where the user input data describes brain activity;
  move the cursor to a 3D key in the plurality of 3D keys based on the user input data; and
  record the at least one symbol represented by the 3D key.

2. The virtual keyboard system of claim 1, wherein at least one 3D key in the plurality of 3D keys is segmented into a plurality of regions, and each region represents at least one symbol.

3. The virtual keyboard system of claim 2, wherein the virtual keyboard application further directs the processor to rotate the cursor based on the user input data.

4. The virtual keyboard system of claim 2, wherein the virtual keyboard application further directs the processor to rotate the plurality of 3D keys around a fixed point based on the user input data.

5. The virtual keyboard system of claim 2, wherein the virtual keyboard application further directs the processor to rotate each key in the plurality of 3D keys around a center point of each respective key based on the user input data.

6. The virtual keyboard system of claim 1, wherein the virtual keyboard application further directed to move the cursor based on input from a motion tracking system.

7. The virtual keyboard system of claim 1, wherein the display device displays a 2D representation of the virtual environment from at least one given viewpoint.

8. The virtual keyboard system of claim 1, wherein each 3D key is a sphere.

9. A method for typing using a virtual keyboard, comprising:
displaying a plurality of 3D keys in a virtual environment via a display device, where:
  each 3D key object represents at least one symbol;
  the plurality of 3D keys are arranged in a face centered cubic lattice structure;
displaying a cursor in the virtual environment via the display device, where the cursor is movable in at least three dimensions;
obtaining user input data from a brain-computer interface, where the user input data describes brain activity;
moving the cursor to a 3D key in the plurality of 3D key based on the user input data; and
recording the at least one symbol represented by the 3D key.

10. The method for typing using a virtual keyboard of claim 9, wherein at least one 3D key in the plurality of 3D key objects is segmented into a plurality of regions, and each region represents at least one symbol.

11. The method for typing using a virtual keyboard of claim 10, further comprising rotating the cursor based on the user input data.

12. The method for typing using a virtual keyboard of claim 10, further comprising rotating the plurality of 3D keys around a fixed point based on the user input data.

13. The method for typing using a virtual keyboard of claim 10, further comprising rotating each key in the plurality of 3D keys around a center point of each respective key based on the user input data.

14. The method for typing using a virtual keyboard of claim 9, further comprising moving the cursor based on input from a motion tracking system.

15. The method for typing using a virtual keyboard of claim 9, wherein the display device displays a 2D representation of the virtual environment from at least one given.

16. The method for typing using a virtual keyboard of claim 9, wherein each 3D key is a sphere.

* * * * *